Nov. 9, 1965 J. B. HUTCHINSON 3,216,531
MATERIAL HANDLING DEVICES
Filed June 18, 1963 2 Sheets-Sheet 1
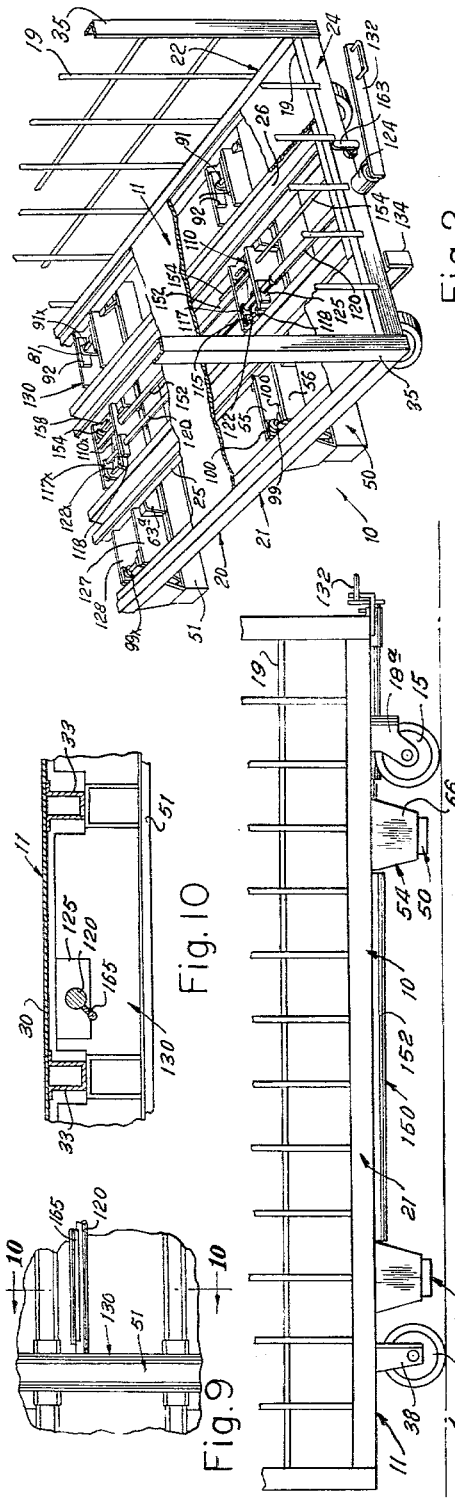
INVENTOR
Jesse B. Hutchinson
BY *Hastings Ackley*
*and*
*Walter J. Jagmin*
ATTORNEYS Nov. 9, 1965   J. B. HUTCHINSON   3,216,531
MATERIAL HANDLING DEVICES
Filed June 18, 1963   2 Sheets-Sheet 2

INVENTOR
Jesse B. Hutchinson
BY
ATTORNEYS

United States Patent Office 3,216,531
Patented Nov. 9, 1965

3,216,531
MATERIAL HANDLING DEVICES
Jesse B. Hutchinson, Dallas, Tex. (% M-H Equipment Co., Inc., P.O. Box 998, Duncanville, Tex.)
Filed June 18, 1963, Ser. No. 288,804
17 Claims. (Cl. 188—5)

This invention relates to material handling devices and more particularly to wheeled vehicles which are transportable between different locations by trucks, railroad cars or the like.

An object of this invention is to provide a new and improved wheeled vehicle which may be loaded at one location, such as one freight terminal, and then transported by means of a railroad car, truck or the like, to another location, such as another freight terminal, at which it may be unloaded.

Another object is to provide a cart having wheels and support means selectively movable downwardly from upper retracted positions to lower extended supporting positions for supporting the cart against movement and removing the load of the cart off its wheels so that the wheels and their mounting means are not subjected to vibrational and shock forces during the transportation of the cart by a truck or the like.

Still another object is to provide a cart of the type described wherein the support means includes a plurality of transversely extending support shoes movably secured to the platform of the cart and movable between lower extended or supporting positions wherein the cart is supported by support shoes and upper retracted positions wherein the cart is supported by the wheels.

A further object is to provide a cart of the type described having operator means for selectively moving the shoes between their extended and retracted positions wherein the operator means automatically locks the shoes in both their retracted and extended positions.

A still further object is to provide a cart of the type described wherein the weight of the shoes and the operator means is effective to lock the support shoes in their retracted upper positions and wherein the weight of the cart and its load when supported by the shoes is effective to lock the shoes in their extended supporting positions.

Another object is to provide a cart of the type described which is transportable from one location to another by a fork lift whose lift arms are insertable below the platform of the cart, wherein a release means is provided for automatically releasing the operator means from its locked position holding the support shoes in their retracted upper positions to permit the support shoes to move from their retracted positions to their extended supporting positions whenever the cart is raised by such means in order to prevent any undue loads to be imposed on the wheels in the event that the cart is again lowered or dropped by the fork lift onto a supporting surface and to prevent the cart from rolling if set down on an inclined surface or if the fork lift truck is still in motion at the time the cart is set down so that the momentum of the cart so imparted thereto tends to cause it to roll.

Still another object is to provide a cart of the type described wherein the operator means includes a linkage having a main operator lever which is locked by the weight of the support shoes and the operator mechanism thereof when the support shoes are in their upper retracted positions and is locked by the weight of the load supported by the support shoes when the support shoes are in their extended load supporting positions.

Another object is to provide a cart of the type described wherein the release means comprises a means disposed below the cart and engageable by the lift arms of a fork lift which engages the main lever or locking links for moving the main lever past a dead center position to cause the linkage to be unlocked and free the support shoes for movement to their lower extended support positions.

Additional objects and advantages of the invention will be readily apparent from the reading of the following description of a device constructed in accordance with the invention, and reference to the accompanying drawings thereof, wherein:

FIGURE 1 is a fragmentary side view of a cart embodying the invention;

FIGURE 2 is a fragmentary perspective view, with some portions broken away and with the support shoes in their lower supporting positions, of the cart illustrated in FIGURE 1;

FIGURE 4 is a fragmentary sectional view taken on line 4—4 of FIGURE 3 showing the shoes in their retracted upper positions and the cart supported on its wheels;

FIGURE 9 is a fragmentary bottom view of a modified form of a cart embodying the invention; and, FIGURE 10 is a sectional view taken on line 10—10 of FIGURE 9.

Figure 3:
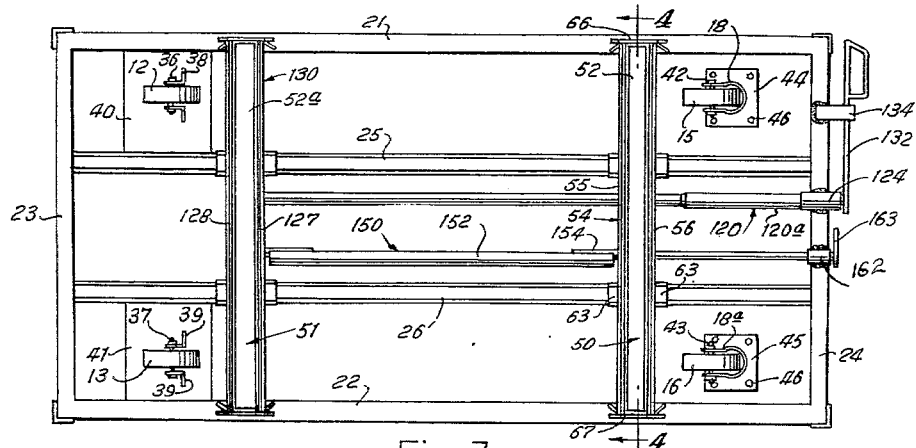
FIGURE 3 is a bottom view of the cart.

Referring now to the drawings, the cart 10 includes the usual bed or platform 11 provided at one end with wheels 12 and 13 which are rotatable about a common fixed horizontal axis and a pair of caster wheels 15 and 16 rotatably mounted on the usual casted brackets 18 and 18a which are rotatable about vertical axes whereby the cart may be readily turned or caused to change its direction of movement. The platform may be provided with any suitable vertical walls which are secured to and extend upwardly from the platform, as for example the grid or lattice walls 19 illustrated in the drawing, to retain the objects loaded in the cart on the platform. The platform may include a rectangular frame 20 having longitudinal parallel side members 21 and 22, transverse end members 23 and 24 and longitudinal brace members 25 and 26 which extend between the end members. Each of the side and end members may include an inner outwardly opening channel section 27 which is closed by an outer laterally inwardly opening chanel section 28. The lower horizontal flange 28a of each outer channel section is telescoped into its inner channel section 27 and rests on the lower horizontal flange 27a of the inner channel section and its upper horizontal flange 28b extends over and rests on the upper horizontal flange 27b of its inner channel section. The extreme outer peripheral edge portions of the floor 30 of the platform extend over and rest on the upper flanges 27b of the inner sections of the side and end frame members. The brace members 26 and 27 may also be channel shaped, whose vertical flanges 33 have laterally outwardly extending extensions 34 which abut the bottom surface of the floor. The frame members and the floor are rigidly secured to one another in any suitable manner, as by welding, so that the platform 11 is of very strong and rigid construction.

The upwardly extending walls 19 may include corner angle members 35 and be secured to the frame 21 in any suitable manner, as by welding.

The wheels 12 and 13 are rotatably mounted on the shafts 36 and 37, mounted on pairs of brackets 38 and 39, respectively, which depend from the flat mount plates 40 and 41, respectively, rigidly secured to the platform as by welding. The caster wheels 15 and 16 are rotatably mounted on the shafts 42 and 43, respectively, which are mounted on the usual bifurcated brackets 18 and 18a, rotatably secured in the usual manner for rotation about vertical axes on the mount plates 44 and 45 rigidly secured, as by the bolts or screws 46, to the floor 30. The cart 10 is thus mobile, being easily moved on its wheels from one location to another, the forward caster wheels 15 and 16 rotating about the vertical axes to permit turning of the platform as required.

If the cart is to be transported from one location to another by a truck, or the like, and if the cart is supported in such truck on its wheels, the wheels must be locked to prevent movement of the cart on the wheels. In addition, if the cart is supported on its wheels on the truck, vibration and shocks imparted to the cart due to the movement of the truck over the usual bumps or irregularities in the road are transmitted to the cart wheels and their mounting means so that the bearing means by which the wheels are rotatably supported on their shafts quickly wear and fail. In addition, since the carts are sometimes loaded on and loaded from the trucks by means of fork lifts, whose arms are insertable transversely below the platform of the truck to support the carts, due to inadvertence or the carelessness of the operator of the fork lift, the carts are sometimes allowed to drop onto the supporting floor with considerable force which also tends to damage the wheels and their mounting means. The support shoes 50 and 51 are provided to support the carts during their transportation by a truck in order to prevent such vibrational and shock forces from being transmitted to the wheels. The support shoes 50 and 51 are mounted on the bottom of the platform 11 and are movable between the upper retracted positions illustrated in FIGURES 1, 3 and 4 wherein their flat bottom walls 52 and 52a are disposed above the lower surfaces of the wheels and do not prevent movement of the cart on the wheels and the lower extended supporting positions illustrated in FIGURES 2 and 5 wherein their bottom walls are disposed below the lower surfaces of the wheels and support the cart. The frictional engagement of the shoes with the floor of the truck prevents movement of the cart on the truck and in addition prevents any vibrational or shock loads from being transmitted to the wheels.

The shoe 50 is mounted for vertical movement in a shoe housing 54 which extends transversely across the platform between the side members 21 and 22 of the frame 20. The shoe housing includes a pair of parallel transversely extending vertical walls 55 and 56 whose upper edges may be spaced from the floor 30 and be provided with upwardly opening recesses or notches 58 and 59, through which extend the longitudinal brace frame members 25 and 26, respectively, and notches or recesses 60 and 61 in which are received the side frame members 21 and 22, respectively. The side walls are secured to the longitudinal brace members and to the frame members by the brackets or gusset members 63 which are welded to the walls and to the frame members. The shoe housing also includes a pair of end walls 66 and 67 which may be rigidly secured to the side walls and to the side frame members 21 and 22, respectively, as by welding.

The shoe 50 may be in the form of a rectangular open top box and have vertical side walls 70 and 71 and vertical end walls 73 and 74 which extend upwardly from its bottom wall 52. The support shoe is telescopable in the downwardly opening shoe housing 54 and is connected to the shoe housing, adjacent one end by the pair of links 80 and 81 and adjacent its other end by the pair of links 82 and 83. The lower or shoe link 80 may be substantially channel shaped having a web 80a and spaced parallel flanges 80b and 80c. The lower end of the shoe link is pivotally secured to the shoe by means of a shaft 86 which extends through suitable aligned apertures in the flanges of the shoe link and whose opposite ends are received in suitable apertures in the shaft mount plates 88 which abut the side walls 70 and 71 of the shoe and are rigidly secured thereto by welding.

The upper or housing link 81 is also substantially channel shaped having a web 81a and parallel flanges 81b and 81c and its upper end is pivotally secured to the shoe housing 54 by means of a shaft 91 which extends through suitable aligned apertures in the flanges 81b and 81c whose opposite ends are received in the mount plates 92 rigidly secured to the walls 55 and 56 of the shoe housing. The flanges 80b and 80c of the shoe link extend between the flanges 81b and 81c of the housing link and are pivotally secured thereto by a link connector pivot pin 94 which extends through aligned apertures of the flanges of the links. The shoe links 82 and 83 are identical in structure to the links 80 and 81, respectively, the lower end of the shoe link 82 being pivotally connected to the shoe 50 by the shaft 96 which extends through suitable aligned apertures in the flanges of the link 82 and whose opposite ends are received in suitable bolster plates 97 rigidly secured by welding to the walls 70 and 71 of the shoe and the upper end of the link 83 being pivotally secured to the shoe housing by means of the shaft 99 which extends through suitable aligned apertures in the flanges of the housing link 83 and whose opposite ends are received in suitable apertures in the mount plates 100 rigidly secured by welding to the side walls 55 and 56 of the shoe housing. The upper ends of the flanges of the shoe link 82 extend between the lower ends of the flanges of the housing link 83 and are pivotally secured thereto by the link connector pivot pin 101.

The two pairs of links are connected by a link connector rod or member 102, which may be tubular in form, whose opposite ends extend between the flanges of the shoe links 80 and 82 and are provided with apertures 103 and 104 through which the pivot pins 94 and 101 extend. The webs 80a and 81a are provided with recesses or notches 80d and 81d, respectively, to permit the connector rod 102 to extend therebetween and the webs 82a and 83a of the links 82 and 83 are similarly provided with recesses 82d and 83d for the same purpose. The connector rod causes the links 82 and 83 to move simultaneously with the links 80 and 81 to ensure that the shoe 50 is maintained at all times in a horizontal position during its movement between its retracted and extended positions.

Figure 5:
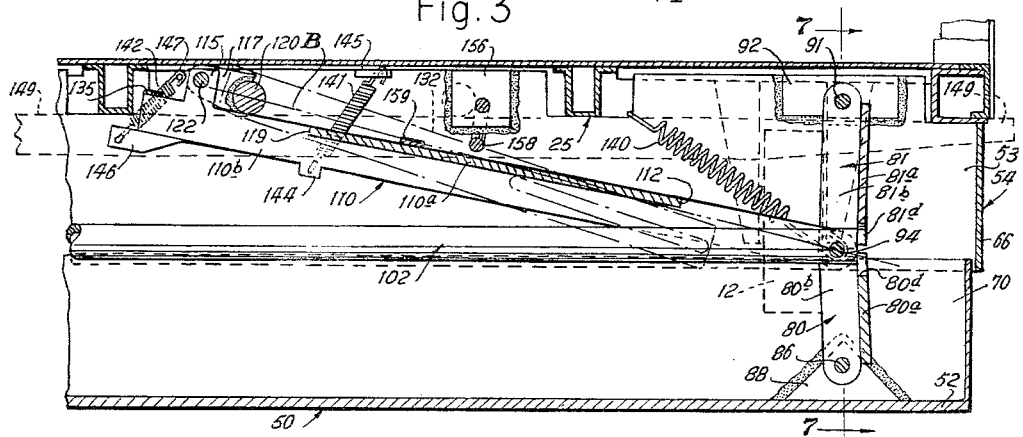
FIGURE 5 is a fragmentary sectional view, similar to FIGURE 4, showing the support shoe in its supporting position.
Figures 6, 8A:
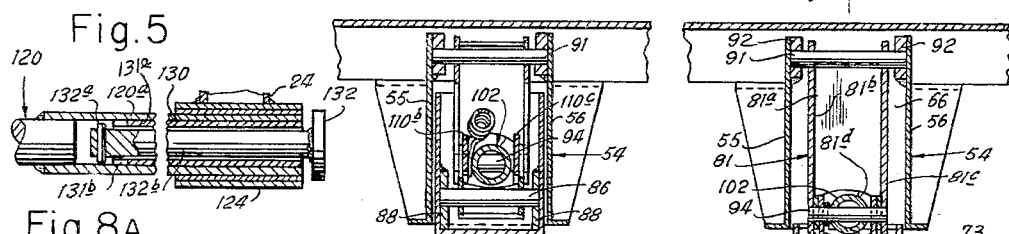
FIGURE 6 is a fragmentary sectional view taken on line 6—6 of FIGURE 4.
FIGURE 8A is a fragmentary sectional view of the handle mounting of the cart.
Figure 8:
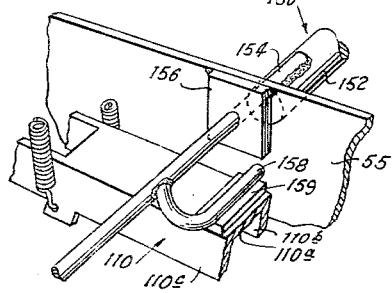
FIGURE 8 is a fragmentary sectional view of the release mechanism and the main lever of the operator means of the cart.
Figure 7:
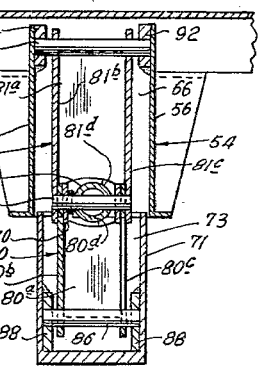
FIGURE 7 is a fragmentary sectional view taken on line 7—7 of FIGURE 5.

It will be apparent that the shoe links 80 and 82 pivot in a counter-clockwise direction, FIGURE 4, about their shafts 86 and 96, the housing links 81 and 83 pivot in a clockwise direction about their shafts 91 and 99, the upper ends of the shoe links pivot in a counter-clockwise direction about the connector pivot pins 94 and 101, the lower ends of the housing links 81 and 83 pivot in a clockwise manner about the connector pivot pins 94 and 101 and the link connector rod or member 102 moves to the left when the shoe 50 moves from its retracted position shown in FIGURES 1, 4 and 6 to its extended position shown in FIGURES 2, 5 and 7. Conversely, the links pivot in the opposite directions about their pivot pins and the connector rod 102 moves to the right as the shoe moves from its extended to its retracted position.

The movement of the links and the connector rod, and therefore the shoe 50, is controlled by an operator main lever for locking link 110, which also may be of substantially channel form having a web 110a and a pair of vertical parallel flanges 110b and 110c whose lower ends extend on opposite sides of the link connector member 102 and between the connector member and the flanges 80b and 80c of the shoe link 80 and are provided with suitable aligned apertures through which the link connector pivot pin 94 extends. The web 110a of the locking link 110 is cut away, as at 112, so that it will not engage the connector member 102 or interfere with its movement. The flanges 110b and 110c are provided with vertical arms or extensions 115 and 116 which extend upwardly between the pair of lever arms 117 and 118 which extend radially outwardly from the operator shaft 120 and are pivotally secured to the operator shaft arms by the pin 122 which extends through suitable aligned apertures in the extensions 115 and 116 of the lever and in the arms 117 and 118. The web 110a of the locking link is cut away or provided with a recess 119 to permit movement of the operator shaft arms between the upper ends of the flanges 110b and 110c.

The operator shaft 120 is journalled in a bearing sleeve 124, rigidly connected to the frame 20 by welding and in the side walls 55 and 56 of the shoe housing 54 and mounting plates 125 welded thereto and the side walls 127 and 128 of the shoe housing 130 in which the other support shoe 51 is telescopably movable so that the main operator shaft extends through the shoe housings above the shoes. The forward end of the operator shaft comprises a tubular extension 120a having a tubular latch member 131a telescoped therein and rigidly secured thereto by welding. The inner end portion of the latch member has a pair of diametrically opposite end slots 131b in which are receivable the diametrically outwardly extending end portions of a latch pin 132a of the handle shaft 132b which extends movably through the tubular latch member so that when the handle 132 is moved outwardly and the end portions of its latch pins are received in the slots of the latch member, the shaft may be rotated through approximately 195 degrees to move the locking link between the position illustrated in FIGURE 4 wherein the shoe 50 is held locked in its upper retracted positions and the position illustrated in FIGURES 2, 5 and 7 wherein the shoe is locked and held in its lower extended position. The handle 132 when not in use may be supported on the bracket 134 secured to the platform frame.

When the shoe 50 is in its upper retracted position illustrated in FIGURE 4, the axis of the pivot pin 122 is disposed above the plane passing through the axes of the link connector pivot pin 94 and of the operator shaft 120, which is then in its position A, or above its dead center position with respect to the axes of rotation of the link connector pivot pin and the operator shaft, so that the weight of the shoe and of the elements connected thereto, which tends to move the shoe downward relative to its housing, also tends to move the locking link 110 to the left, figure 4. Any such force tending to move the locking link toward the left, however, tends to cause the operator shaft 120 to rotate in a counterclockwise direction. Such counterclockwise rotation when the shoe 50 is in its upper retracted position is prevented by the engagement of the transverse plate or pad 135 of the locking link 110 with the operator shaft 120 as shown in FIGURE 4. As a result, the locking link is held in its first locking position wherein it locks the shoe in its upper retracted position until the operator shaft is rotated in a clockwise direction through a predetermined angle, for example, approximately five degrees, to cause the axis of the pivot pin 122 to pass through its dead center position relative to the line passing through the axes of the link connector pivot pin 94 and the operator shaft. Such clockwise rotation of the operator shaft may be effected by pulling outwardly on the handle 132 and pivoting the handle about its shaft 132b until its latch pin 132a enters into the slots 131b and then pivoting the handle in a clockwise direction. During such clockwise rotation of the operator shaft the link connector pin 94 is of course moved slightly to the right and the plane also moves slightly downwardly. As soon as the axis of the pivot pin 122 moves past such dead center position, the weight of the shoe and the elements of the linkage connected thereto is effective to move the connector link to the left and continue rotation of the main operator shaft in a clockwise direction until the shoe is in its fully extended position and the axis of the pivot pin 122, which is then in the position B, FIGURE 5, is disposed above the plane passing through the axes of the link connector pivot pin 94 and the operator shaft. At this time, any force applied to the shoe 50 tending to move it to its retracted position in its shoe housing 54 merely tends to hold the locking link in its second locking position wherein it locks the shoe against movement toward its retracted position since the axis of the pivot pin 122 is above the position B of the plane or its second dead center position relative to the axes of the operator shaft and the link connector pivot pin. Further upward movement of the upper end of the locking link and clockwise rotation of the operator shaft is now limited by the engagement of the operator shaft with the upper surfaces of the flanges 110b and 110c of the locking link.

The links 80, 81, 82 and 83 are preferably so positioned when the shoe is in its fully extended load supporting position illustrated in FIGURE 5 that the axes of the link connector pivot pins 94 and 101 are spaced somewhat to the left of the planes passing through the longitudinal axes of the pivot pins 86 and 91 and of the pivot pins 96 and 99, respectively, so that the application of a force tending to move the shoe 50 into its housing tends to move the locking link 110 to the left and therefore to ensure that it remains in locked position.

It will thus be seen that whenever the shoe 50 is in its fully retracted positions, its weight and that of the various linkage elements connected thereto tends to lock it in its retracted position due to the action of the locking link 110 and that when the shoe is in its lower extended supporting position, any force tending to move it to its closed or retracted position also tends to cause the link 110 to hold it locked against such movement.

It will also be apparent that the operator shaft must be rotated in a counterclockwise direction through a predetermined angle from its position illustrated in FIGURE 5 to a position wherein the axis of the pivot pin 122 is below the plane B passing through the axes of the pivot connector link 94 and the operator shaft before the force, such as the weight of the cart and the load supported by it, tending to move the shoe to its retracted position is effective to move the shoe to such retracted position.

If desired, locking springs 140, 141 and 142 may be provided to bias the locking link upwardly and to the left when the shoe is in its retracted position and thus tend to hold the locking link in its first locking position locking the shoe against movement from its retracted position. When the shoe is in its lower extended supporting position illustrated in FIGURE 5, the locking spring 140 biases the main link 110 upwardly and toward the left while the locking springs 141 and 142 bias it upwardly and toward the right. The combined force of these locking springs tending to move the locking link upwardly of course tends to hold the locking link in its second locking position wherein it locks the shoe against movement from its lower extending position toward its retracted position.

The spring 140 may have one hooked end extending about the link connector pivot pin 94 and its other end hooked about the edge of the wall 55 of the shoe housing at the recess 58 thereof. The spring 141 may have one end hooked or extending through a suitable aperture in a downwardly extending tab 144 of the flange 110b of the locking link 110 and its upper end hooked through a suitable aperture in a strap 145 extending across and connected to the walls 55 and 56 of the housing 54. The spring 142 may similarly have one end connected to an extension 146 of the flange 110b and its upper end hooked about a rod 147 which extends between the walls 55 and 56 of the shoe housing and rigidly secured thereto. The locking springs are not essential to the operation of the locking links but may be provided to help hold the locking link in its two operative or locking positions.

The shoe 51 is connected to its shoe housing and to the operator shaft by a linkage identical to that which controls the movement of the shoe 50 and which locks it in either of its two positions and accordingly elements of such linkage of the shoe 51 have been provided with the same reference numerals, to which the subscript "x" has been added, as the corresponding elements of the control linkage of the shoe 50. The shoe 51 is moved from its retracted position to its extended position when the operator shaft 120 is rotated in a clockwise manner, FIGURE 4, by its locking link 110x and is moved from its extended position back to its retracted position when the shaft 120 is rotated in a counter-clockwise direction in the same manner as the shoe 50 is moved between its retracted and extended positions by its locking link 110 and simultaneously therewith.

In order to ensure that the support shoes are moved to their lower extended positions each time the cart is raised by such means as the lift arms 149, FRIGURE 5, of such device as a fork lift truck, not shown, so that the wheels of the hand cart are not subjected to any extensive vibrational or shock forces when the cart is again lowered by the fork lift down to a supporting surface, a release device 150 is provided for moving the lock links 110 and 110x from their first locking positions, wherein they hold the shoes 50 and 51 in their upper positions, to positions wherein the pivot pins 122 and 122x of the links move past their first dead center positions as the fork lift arms move upwardly to engage and support the cart thereon. The release device 150 comprises a longitudinally extending contact rod or bar 152 pivotally mounted on the walls 55 and 127 of the shoe housings 54 and 130, respectively, by the pivot shafts 154 which extend through suitable aligned apertures in the shoe housing walls and in suitable mount plates 156 rigidly secured to these housing walls. Link moving or cam portions 158 and 158x are rigidly secured to the shafts 154 and are spaced from the longitudinal common axis of the shafts 154. The cam portions are engageable with spacer plates 159 of the locking links 110 and 110x of the shoes 50 and 51, respectively. The contact bar 152 is normally held by its own weight in the lower position illustrated in FIGURES 1 and 4 wherein it is disposed below the frame of the platform. The contact bar is pivoted upwardly in a clockwise direction, FIGURE 4, about the axes of the shafts 154 as the fork lift arms engage bar 152 and move upwardly to engage the frame and raise the cart. During such clockwise pivotal movement of the shafts 154, the cam portions 158 and 158x thereof engage the spacer plates 159 to move the upper ends of the locking links downwardly and cause their pivot pins 122 and 122x to move downwardly past their first dead center positions, i.e., below the planes passing through the axes of the operator shaft 120 and the connector pivot links thus moving the locking links from their first locking positions and freeing the shoes 50 and 51 for movement to their lower extending positions. As the locking links move downwardly, their spacer plates move out of engagement with cam portions 158 and 158x and then remain out of contact therewith until the fork lift arms are moved out of engagement with the contact bar and the operator shafts is rotated to raise the shoes. The forward shaft may extend forwardly through a bearing sleeve 162 rigidly secured to the platform frame and be provided with a handle 163 so that the shoes may be manually released for movement from their retracted positions by pivoting the handle 163 in a clockwise manner as seen in FIGURE 2. As soon as the shoes are so released they move downwardly until they engage the ground and the cart may then be raised by moving the operator shaft handle 132 outwardly and at the same time pivoting it about its shaft 132b until its latch pin moves into alignment with and into the slots 131a of the latch member 130. Force must then be applied to the handle to rotate the operator shaft in a clockwise direction and thus raise the cart off its wheels.

In use, the cart 10 may be loaded at one location as, for example, one freight terminal, and is movable between different locations at such freight terminal on its wheels as long as the operator shaft 120 is in the position illustrated in FIGURES 1, 3, 4 and 6 wherein the counter-clockwise rotation of the shaft, as seen in FIGURE 4, is limited by its engagement with the plates 135 of the locking links 110 and 110x. When the cart is loaded and is to be transported from one freight terminal to another on a truck or other vehicle, the cart may be moved by means of its own wheels from the freight terminal onto the bed of the truck and then raised off its wheels by moving the handle outwardly to cause the outer end portions of the latch pin 132a to enter into the latch slots 131a and then pivoted to rotate the shaft by means of the handle in a clockwise manner as seen in FIGURES 4 and 2. During such movement, the locking links 110 and 110x move from their first locking positions to their second locking positions and move the shoes 50 and 51 to their fully extended positions to raise the cart off its wheels and cause it to be supported on the support shoes. The mechanical advantage of the handle and the linkages of the shoes permits the operator to raise the cart off its wheels even though the load carried thereby may be great. Alternatively, the cart may be moved from the freight terminal onto the bed of the truck by a fork lift whose fork lift arms are first moved transversely beneath the platform of the cart and between the shoe housings and then are raised upwardly to lift the cart off the supporting floor. During such upward movement and before the cart is raised off its wheels, the fork lift arms 149 engage the longitudinally extending contact bar 152 of the release device 150 which extends between the shoe housings and pivot the contact bar about the axis of the shafts 154 to cause the locking links of the two shoes to be moved from their first locking positions wherein they hold the shoes locked in their upper retracted positions and permit them to move downwardly toward their extending supporting positions relative to their housings 54 and 130. When the hand cart is raised, the shoes are thus freed to move to their fully extended positions and are locked therein so that if the operator of the fork lift truck for some reason drops or permits the cart to drop onto a supporting surface, the wheels are not subjected to such shock or if the operator sets the cart down on an inclined surface or while in motion, the cart will not roll away. The fork lift truck may then move the cart onto the bed of the truck and lower it whereupon the cart is supported on the shoes 50 with its wheels out of contact with and spaced above the bed of the truck. The truck may then be driven from the freight terminal to a second terminal. During the transportation of the cart by the truck, the carts are supported by the shoes so that the wheels and their mountings are not subjected to vibrational and shock forces to which they would otherwise be subjected due to the movement of the truck over irregular road surfaces and so that the cart will not move in the truck. When the truck arrives at the second freight terminal, the hand cart may be moved off the truck by fork lift to another location in the second freight terminal and then lowered to the ground to again be supported by the shoes 50 and 51. The support shoes may then be raised to their retracted positions by pivoting the handle 132 in a counter-clockwise manner, as seen in FIGURE 2, to lower the cart onto its wheels to be supported thereon, and then locked by their locking links in their fully retracted positions, the counterclockwise movement of the operator shaft then being arrested by its engagement with the plates 135 of the locking links 110 and 110x. Alternatively, once the truck has arrived at such second terminal, the handle 132 may be rotated in a counter-clockwise position, FIGURE 2, while the cart is still on the truck to cause the locking links and the associated linkages thereof to first cause the wheels to engage the bed of the truck and then move the shoes to their fully retracted positions wherein they are locked by their locking links and then rolling the cart on its wheels off the truck and to the desired location in the second freight terminal.

The shoes when urged toward their extended positions by means of the operator shaft handle 132 may also be used as brakes to slow down or arrest movement of the cart on its wheels.

It will now be seen that a new and improved material handling device or cart has been illustrated and described which has wheels by means of which it may be moved and that it is provided with support shoes, telescoped in housings extending downwardly from the bottom of the platform of the cart, which are movable downwardly to extended positions to raise the cart off its wheels so that the cart may be transported from one location to another by another vehicle while supported by the shoes without having undue vibrational and shock forces imparted to the wheels and their bearings or mounting means and without sliding on the truck bed when the truck starts and stops.

It will further be seen that the means for moving each of the shoes between its retracted and extended positions comprises a linkage having at least one pair of links, such as the shoe and housing links 80 and 81, whose lower and upper ends are pivotally secured to the shoe and to the cart platform, respectively, and whose adjacent ends are pivotally connected to one another by a pivot pin or means and a main or locking link pivotally connected to the link connector pivot link for moving the links about their pivotal connections to fully extended positions relative to one another, the axes of pivotal movement of the ends of the links being parallel to one another and extending longitudinally of the cart whereby transverse movement of the locking links in opposite directions moves the shoe and housing links to move the shoe between its retracted and extended positions.

It will further be seen that one end of the locking link is pivotally connected to an operator shaft for pivotal movement about an axis spaced from the axis of rotation of the operator shaft and movable between extreme opposed positions located on opposite sides of the operator shaft and in such extreme positions above the plane passing through the axes of the link connector pivot pin and the operator shaft whereby the locking link locks the shoe in its retracted and extended positions when the operator shaft is in either one of the two extreme positions.

It will further be seen that the rotational movement of the operator shaft in one direction is limited by a stop means, such as a plate 135, which engages the operator shaft and in the other direction by the engagement of the operator shaft with the upper surface of the locking link as shown in FIGURE 5 although other suitable stop means mounted on the platform or shoe housing may be provided for engaging the locking link for this purpose.

It will further be seen that each shoe may be connected to its shoe housing, and therefore to the platform of the cart, by more than one pair of such shoe and housing links, such as the links 82 and 83, and that a connector bar 192 may then be employed to connect the link connector pivot pins of the two pairs of links to one another and causes simultaneous pivotal movement of the two pairs of links.

It will further be seen that the cart is also provided with a release mechanism which causes the shoes to be released from their upper retracted locking positions whenever the cart is lifted by a means, such as the lift arms of a fork lift device which includes a cam means, such as the offset cam portions 158 of the shafts 154 which engage the locking links and move the locking links to positions wherein the shoes are freed for movement from their retracted positions to their extended positions so that any time the cart is raised by suck fork lift device, the shoes move by gravity to their extended supporting positions and cause the cart when it is again lowered to be supported by the shoes so that the wheels are never subjected to any shock forces which may occur if the cart were dropped or lowered with undue velocity onto a supporting surface such as the bed of a truck, the floor of a freight terminal or the like.

It will further be seen that manually operable means, such as the handle 132, are provided for rotating the operator shaft in order to move the locking links of the shoes between their two extreme locking positions, and the shoes between their retracted and extended positions, so that the car may be selectively caused to be supported either on its shoes or on its wheels for movement over a floor or other supporting surface.

It will further be seen that due to the provision of the automatic locking means and the release device, the shoes are held in either of their extreme retracted or extended positions and will not therefore interfere with the movement of the cart on its wheels when in retracted positions and will not permit accidental or inadvertent dropping of the cart onto its wheels whenever the cart is raised by any means which passes below its platform and engages the contact bar 152 of the release device 150

It will also be seen that the shoe housings guide the movement of the shoes and help hold the shoes against undesired lateral displacement.

Referring now particularly to FIGURES 9 and 10 of the drawing, the operator shaft 120 may itself be provided with a contact means 165 engageable with the fork lift arms for rotating the operator shaft through a small angle to move the axes of the pins 122 and 122x past their dead center position relative to the axes of the operator shaft at the link connector pins 94. As shown in FIGURES 9 and 10, the contact means 165 may be in the form of a bar disposed between the shoe housing and extending radially outwardly and downwardly from the shaft and below the longitudinal members 25 and 26 of the platform when the shoes are in their retracted positions so that when the lower edge of the contact bar is engaged by the fork lift arms as they move upwardly to the left of the cart The operator shaft must of course be spaced below the floor of the cart a distance sufficiently great to permit movement of the contact bar therepast as the operator shaft rotates between its two extreme positions. The release means or device 150 is, of course, not provided where the operator shaft itself is provided with the release contact bar The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A cart including: a platform; wheels rotatably secured to said platform for supporting said platform; support means mounted on said platform and movable vertically below and relative to said platform between upper and lower supporting positions, said platform being supported on said wheels when said support means are in said upper position and being supported on said support means when said support means are in said lower supporting position; and means connecting said support means to said platform and operable to move said support means between said upper and lower positions, said connecting means including means for locking said support means in said upper position by the force of the weight of said support means when said support means is in said upper position and for locking said support means in said lower position by the force tending to move said support means from said lower position toward said upper position.

2. A cart including: a platform; wheels rotatably secured to said platform for supporting said platform; support means mounted on said platform and movable vertically below and relative to said platform between upper and lower supporting positions, said platform being supported on said wheels when said support means are in said upper position and being supported on said support means when said support means are in said lower supporting position; and means connecting said support means to said platform and operable to move said support means between said upper and lower positions, said connecting means comprising a linkage having a pair of links whose adjacent ends are pivotally connected to one another by a link connector pivot means and whose remote ends are connected to said support means and said platform; an operator shaft rotatably mounted on said platform; a locking link having one end pivotally connected to said link connector pivot means; means pivotally connecting the other end of said locking link to said operator shaft for pivotal movement about an axis spaced from and parallel to the axis of rotation of said operator shaft, the axes of pivotal movement of said links and the axis of rotation of said operator shaft being parallel, the axis of pivotal movement of said other end of said locking link being above the plane in which are disposed the axis of rotation of said operator shaft and the axis of said connector pivot means when said support means is in said upper and in said lower positions, said axis of pivotal movement of said other end being disposed between said operator shaft and said link connector pivot means when said support means is in said upper position, said operator shaft being disposed between said axis of pivotal movement of said other end of said locking link and said link connector pivot means when said support means is in said lower position, said locking link engaging said operator shaft to limit upward movement of said other end of said locking link when said support means is in said upper and lower positions whereby said support means is locked in said upper position by the force of the weight of said support means when said support means is in said upper position and said support means is locked in said lower position by the force tending to move said support means from said lower position toward said upper position when said support means is in said lower position.

3. A cart including: a platform; wheels secured to said platform for supporting said platform for movement over a supporting surface; a pair of spaced support shoes; means connecting said shoes to said platform for movement relative to said platform between lower extended positions wherein said shoes support said platform on the supporting surface and hold the wheels off the supporting surface in their upper positions, said connecting means of each shoe comprising a lower link whose lower end is pivotally connected to said shoe and an upper link whose upper end is pivotally connected to said platform, and link connector pivot means pivotally connecting the upper end of said lower link and the lower end of said upper link, said link connector pivot means being disposed in substantial vertical alignment with the upper and lower ends of said links when said shoe is in said lower position and being spaced laterally outwardly therefrom when said shoe is above the supporting surface and the platform is supported on said wheels; operator means operatively associated with said connecting means of each of said shoes for moving said shoes between said lower and upper positions, said operator means comprising an operator shaft rotatable through a predetermined angle and a locking link for each of said shoes, one end of each locking link being pivotally connected to the link connector pivot means of its associated shoe and its other end being pivotally connected to said operator shaft for pivotal movement about an axis extending parallel to and spaced from the axis of rotation of said operator shaft, said axis of pivotal movement of said other end of each of said locking links when said shoes are in said upper and lower positions being disposed above the plane passing through the axis of rotation of said operator shaft and the axis of pivotal movement of said links about said link connector pivot means, said axis of pivotal movement of said other end of each of said locking links being disposed in a first extreme position between said link connector pivot means and said axis of rotation when said shoes are in said lower positions and being disposed in a second extreme position spaced from the side of said operator shaft remote from said link connector pivot means when said shoes are in said lower positions said locking links engaging said operator shaft to limit upward movement of said other end of each of said locking links when said support means are in their upper and lower positions whereby said support means are locked in said upper positions by the force of the weight of said support means when said support means are in their upper positions and said support means are locked in said lower positions by the force tending to move said support means from said lower positions toward said upper positions when said support means are in their lower positions.

4. A cart including: a platform; wheels rotatably secured to said platform for supporting said platform; a pair of spaced downwardly opening housings extending downwardly from the platform; a shoe vertically moveable in each of said housings between an upper retracted position and a lower extended position, said shoes when in said lower positions supporting said platform and holding said wheels in inoperative position; means connecting said shoes to said platform, said connecting means of each of said shoes comprising two pair of spaced links, each pair of links including a shoe link whose lower end is pivotally secured to said shoe and a housing link whose upper end is pivotally secured to said platform, and a link connector pivot means connecting the upper end of said shoe link and the lower end of said housing link; means connecting the link connector pivot means of the two pairs of links of each shoe; and operator means comprising a rotatable operator shaft extending between said shoes and thorugh said housings and a locking link in each of said housings, each of said locking links having one end pivotally connected to said link connector pivot means of one pair of said links and having its other end connected to said operator shaft for pivotal movement about an axis spaced from the axis of rotation of said operator shaft.

5. The cart of claim 4, wherein said axis of pivotal movement of said other end of each of said locking links when said shoes are in said upper and lower positions being disposed above the plane passing through the axis of rotation of said operator shaft and the axis of pivotal movement of said link about said link connector pivot means, said axis of pivotal movement of said other end of each of said locking links being disposed in a first extreme position between said link connector pivot means and said axis of rotation when said shoes are in said lower positions and being disposed in a second extreme position spaced from the side of said operator shaft remote from said link connector pivot means when said shoes are in said lower positions, and means for rotating said operator shaft, said operator shaft moving said axis of pivotal movement of said other end of each locking link when rotated in one direction from said one extreme position to said second extreme position and when rotated in the opposite direction from said second extreme position to said first extreme position.

6. The cart of claim 5; and means operatively associated with said operator shaft limiting rotation of said operator shaft in said one direction when said axis of pivotal movement is in said one extreme position and limiting rotation of said operator shaft in said opposite direction when said axis of pivotal movement is in said second extreme position.

7. The cart of claim 4 and release means extending between said housings and movable by means insertable below the platform for lifting the platform, said release means having means engageable with said locking links for moving said locking links and rotating said operator shaft to position wherein said axis of pivotal movement of said other end of each said locking links moves below said plane and said shoes are freed for movement from their upper position to their lower position before said platform is lifted by such lifting means.

8. The cart of claim 7, wherein said release means includes manually operable means for operating said release means.

9. The cart of claim 4; and release means extending between said housings and movable by means insertable below the platform for lifting the platform for rotating said operator shaft to a position wherein said axis of pivotal movement of said other end of each of said locking links moves below said plane and said shoes are freed for movement from their upper positions to their lower positions before said platform is lifted by such lifting means.

10. The cart of claim 9, wherein said release means comprises means rigid with said operator shaft and extending downwardly therefrom for engagement by the lifting means.

11. The cart of claim 1; and release means operatively associated with said connecting means and operable by lifting means insertable below the platform to lift the platform for releasing said support means for movement toward their lower positions before said platform is lifted by the lifting means.

12. The cart of claim 11; wherein said release means includes manually operable means for operating said release means.

13. The cart of claim 3; and release means extending below said platform and movable by means insertable below said platform for lifting the platform, said release means having means engageable with said locking links for moving said locking links downwardly and rotating said operator shaft to position wherein said axis of pivotal movement of said other end of each said locking links moves below said plane and said support means are freed for movement from their upper positions to their lower positions before said platform is lifted by such lifting means.

14. The cart of claim 3; and release means extending between said support means and movable by means insertable below the platform for lifting the platform for rotating said operator shaft to a position wherein said axis of pivotal movement of said other end of each of said locking links moves below said plane and said shoes are freed for movement from their upper positions to their lower positions before said platform is lifted by such lifting means.

15. The cart of claim 14; wherein said release means comprises means rigid with said operator shaft and extending angularly downwardly therefrom.

16. The cart of claim 2; and release means below said platform engageable by means insertable below said platform and operatively associated with said locking links for moving said locking links and rotating said operator shaft to position wherein said axis of pivotal movement of said other end of said locking link moves below said plane and said support means is freed for movement toward its lower position before said platform is lifted by such lifting means.

17. The cart of claim 2; and release means below said platform operatively associated with said operator shaft and engageable by means insertable below said platform for lifting the platform for rotating said operator shaft to a position wherein said axis of pivotal movement of said other end of said locking links moves below said plane and said support means is freed for movement toward its lower position before said platform is lifted by such lifting means.

References Cited by the Examiner

UNITED STATES PATENTS

| 2,020,386 | 11/35 | Ulrich | 188—5 X |
|---|---|---|---|
| 2,154,952 | 4/39 | Mahloch. | |
| 2,335,401 | 11/43 | Fine | 188—5 |
| 2,537,909 | 1/51 | Puddester | 188—5 X |
| 2,703,632 | 3/55 | Gambardella | 188—5 |
| 2,739,784 | 3/56 | Thompson et al. | |

MILTON BUCHLER, *Primary Examiner.*

DUANE A. REGER, *Examiner.*